Feb. 12, 1952     W. S. PRAEG     2,585,272
AUTOMATIC GEAR FINISHING MACHINE

Filed Feb. 3, 1947     6 Sheets-Sheet 1

FIG.I.

*INVENTOR.*
WALTER S. PRAEG
BY
Whittemore, Hulbert
& Belknap    ATTORNEYS

Feb. 12, 1952      W. S. PRAEG      2,585,272
AUTOMATIC GEAR FINISHING MACHINE

Filed Feb. 3, 1947      6 Sheets-Sheet 2

INVENTOR.
WALTER S. PRAEG

BY
Whittemore, Hulbert
& Belknap ATTORNEYS

Feb. 12, 1952 W. S. PRAEG 2,585,272
AUTOMATIC GEAR FINISHING MACHINE
Filed Feb. 3, 1947 6 Sheets-Sheet 3

INVENTOR.
WALTER S. PRAEG
BY
Whittemore, Hulbert
& Belknap ATTORNEYS

Feb. 12, 1952 W. S. PRAEG 2,585,272
AUTOMATIC GEAR FINISHING MACHINE
Filed Feb. 3, 1947 6 Sheets-Sheet 4

INVENTOR.
WALTER S. PRAEG
BY
Whittemore, Hulbert
& Belknap ATTORNEYS

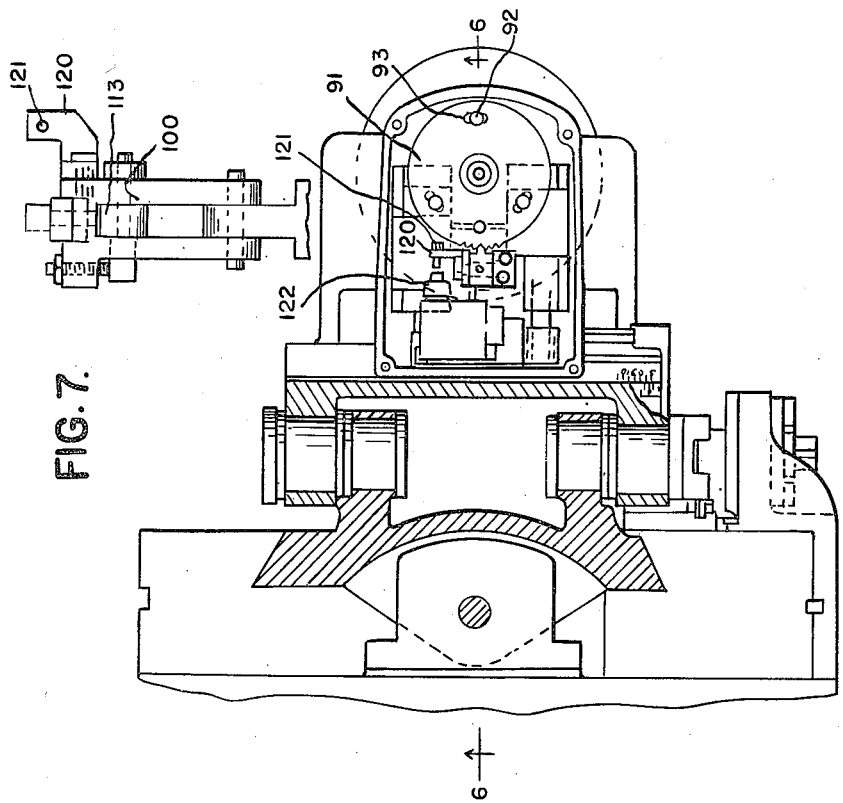
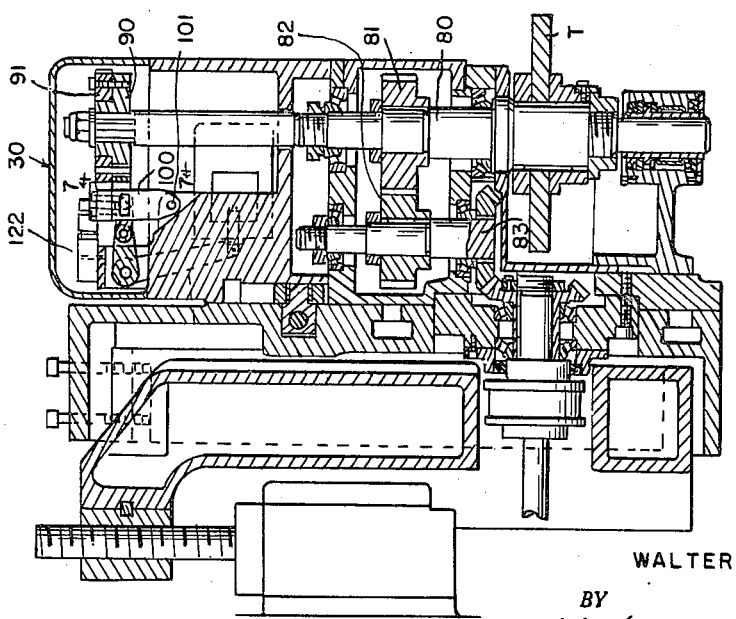

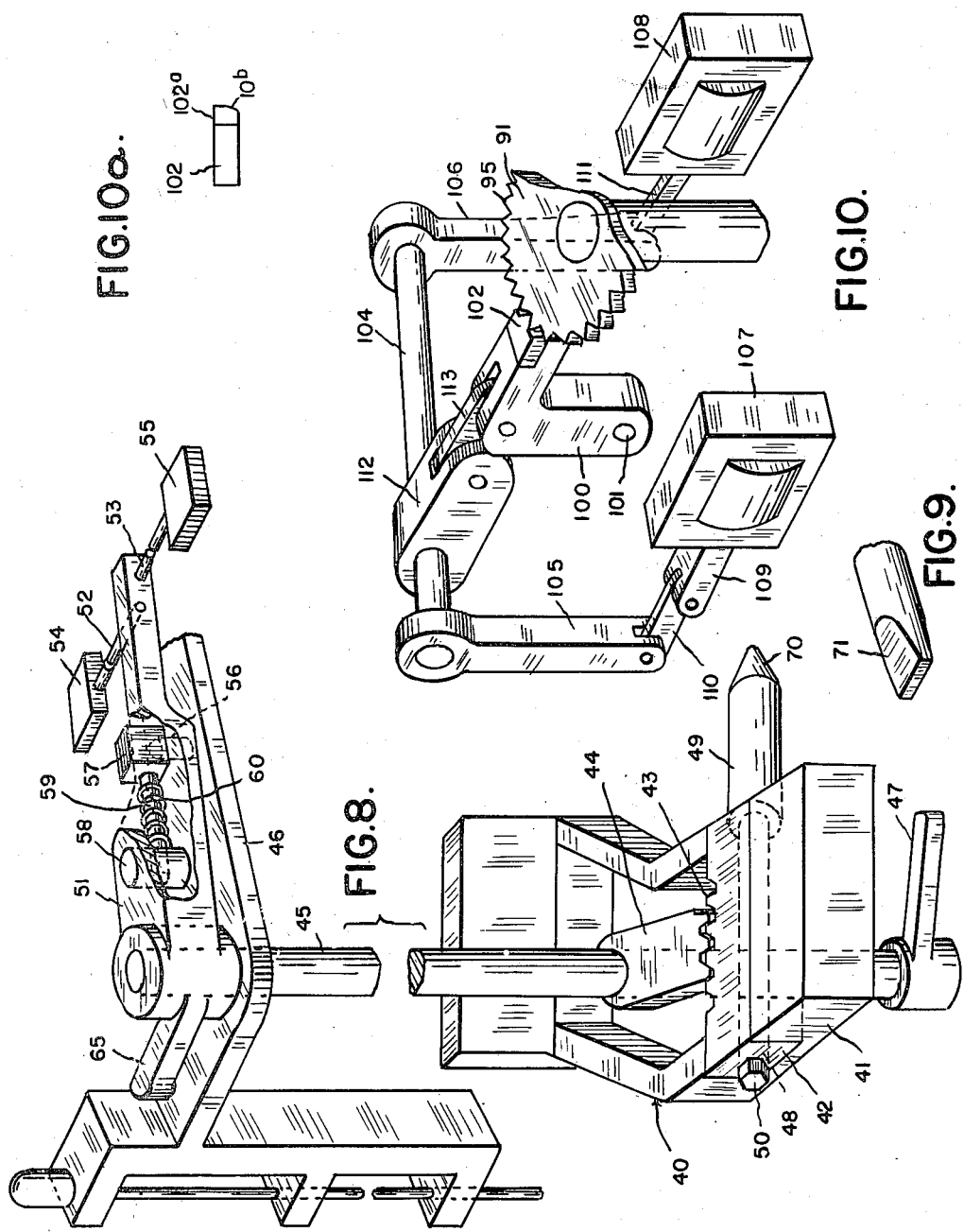

Patented Feb. 12, 1952

2,585,272

UNITED STATES PATENT OFFICE 2,585,272

AUTOMATIC GEAR FINISHING MACHINE

Walter S. Praeg, Detroit, Mich., assignor to National Broach & Machine Company, Detroit, Mich., a corporation of Michigan Application February 3, 1947, Serial No. 726,119

7 Claims. (Cl. 90—1.6)

The present invention relates to a gear finishing machine and more particularly to a multiple station gear finishing machine provided with means for effecting intermeshing engagement between a gear and a gear-like tool as the gear is moved from a loading station to a work station.

It is an object of the present invention to provide mechanism for insuring correct meshing engagement between a gear and a gear-like tool as the parts are moved together at a working station after a work gear has moved from a loading station to a working station.

More specifically, it is an object of the present invention to provide gear locating mechanism manually operable at the loading station to fix the gear in rotation and to retain it in fixed position of rotation as it moves to the working station.

It is a further object of the present invention to provide gear loading mechanism constructed and arranged to sense gear characteristics and to prevent subsequent operation of the machine in the event of more than predetermined deviation from standard gear characteristics.

In line with the foregoing, it is a further object of the present invention to provide gear locating mechanism including means insertable into the teeth of a work gear adapted to fix the work gear in rotation and to prevent subsequent operation of the machine in the event that the gear is oversize or exhibits dangerous deviations from other gear characteristics.

It is a further object of the present invention to provide an automatic gear finishing machine having loading and working stations in conjunction with means for relatively fixing a gear and gear-like tool in rotation for proper meshing engagement as they move together at the working station.

It is a further object of the present invention to provide an automatic gear finishing machine tool locating mechanism adapted to rotate a tool into a desired position of rotation against the resistance offered by tool driving mechanism and to retain the tool in such predetermined position of rotation.

Other objects and features of the invention will become apparent as the description proceeds, especially when taken in conjunction with the accompanying drawings, wherein:

Figure 5 is a fragmentary horizontal section through the tool support;

Figure 6 is a fragmentary section on the line 6—6 of Figure 5;

Figure 7 is a fragmentary section on the line 7—7 of Figure 6;

Figure 8 is an exploded perspective view of the gear locating mechanism;

Figure 9 is a fragmentary view of a nose piece adapted for use with the gear locating mechanism;

Figure 10 is a perspective view of the mechanism for locating the tool; and

Figure 10a is a side elevation of the tooth for indexing the cutter.

The gear finishing machine disclosed herein is an automatic machine comprising a work holding turret having two loading stations and two working stations and a pair of tool supports reciprocable toward and away from the turret into and out of working position.

Figure 1:
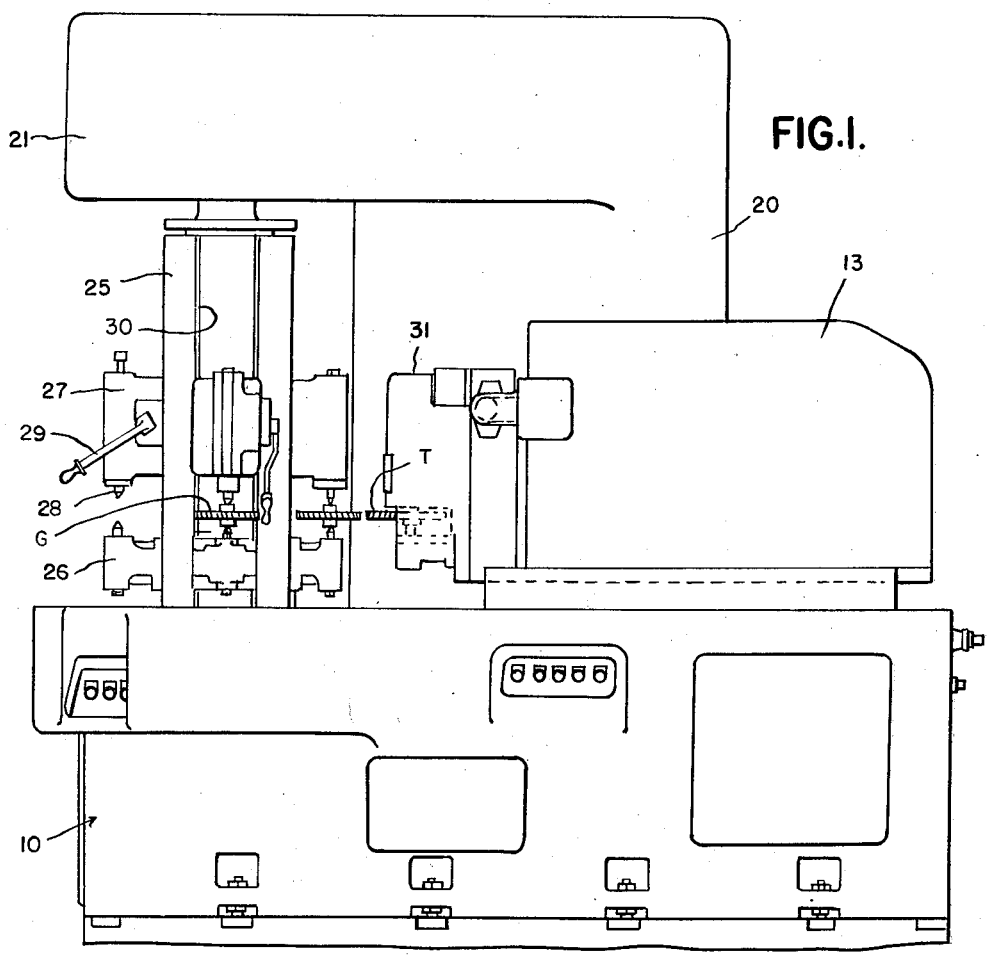
Figure 1 is a front elevation of a gear finishing machine constructed in accordance with the present invention.
Figure 2:
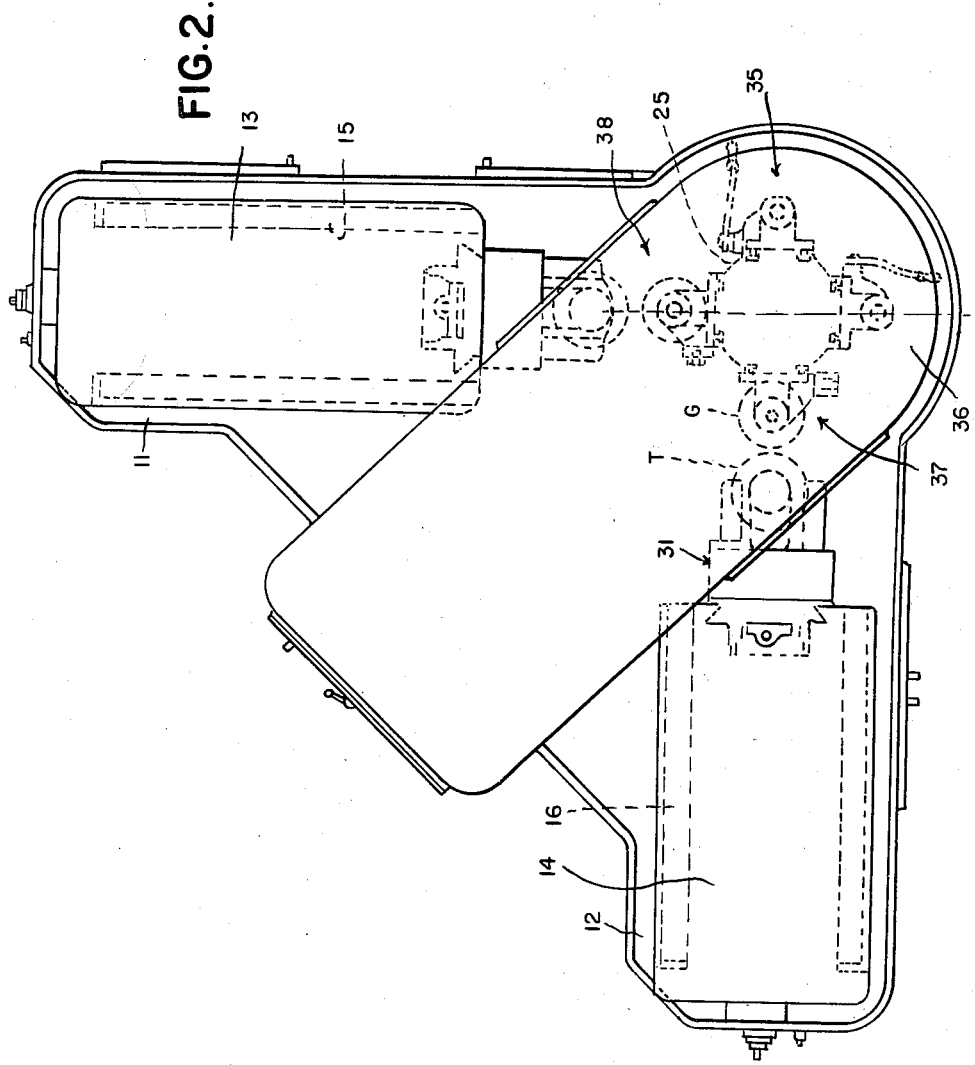
Figure 2 is a plan view of the gear finishing machine shown in Figure 1.
Figure 3:
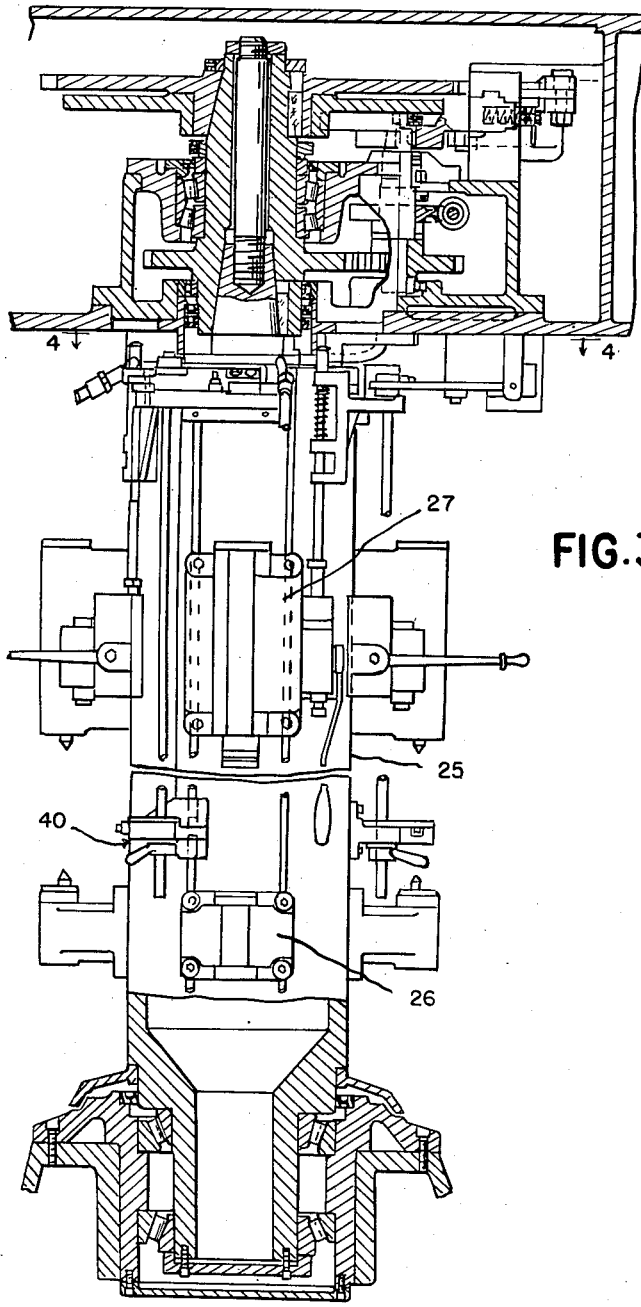
Figure 3 is an elevation partly in section of the work holding turret.

As seen in Figures 1 and 2, the machine comprises a main bed 10 having angularly related projections 11 and 12 on which are mounted tool carriages 13 and 14, respectively. Tool carriages 13 and 14 are mounted on suitable ways indicated at 15 and 16, respectively, on which they are reciprocable by driving means which forms no part of the present invention. Projecting upwardly adjacent the center of the machine is a column 20 provided with an overhanging turret support 21. Intermediate the turret support 21 and the base 10 of the machine is a turret 25, which as illustrated in the present figures, comprises essentially a 4-sided column, each of which is provided with a headstock 26 and a tailstock 27 provided with an axially movable center 28 movable in a vertical direction by a lever 29. It will be appreciated of course that the centers 26 and 27 are independently vertically adjustable in suitable ways such as indicated at 30 and that for any sequence of work pieces they will be adjusted to appropriate position and thereafter locked in fixed position. Thereafter work pieces such as the gear G illustrated in Figure 1 may be loaded and unloaded from the machine by appropriate manipulation of the lever 29.

The gears G supported between the headstock and tailstock are mounted for free rotation thereon and are adapted to engage a gear-like tool such for example as a shaving cutter in crossed axes relationship.

As best seen in Figure 1, the tool carriage 13 carries at its front end a tool slide 31 upon which is supported the gear-like tool T. Suitable mechanism which forms no part of the present invention and which accordingly is not illustrated in detail is provided for rotating the tool T in mesh with the gear G and also for effecting movement of the tool slide 31 in a vertical direction; that is, in a direction parallel to the axis of the gear G.

Referring now to Figure 2, it will be observed that the turret 25 has two of the work supporting fixtures which comprise the stocks 26 and 27 at loading stations designated 35 and 36, respectively. The other two gear supporting fixtures are at the working stations indicated at 37 and 38, respectively, in position to be engaged by the tool T when the tool carriages 13 and 14 are advanced toward the turret 25. In the operation of the machine a single operator loads an unfinished gear G at the tool supporting fixtures which are located at the loading stations 35 and 36. While the loading operation is being carried out the gears in the working stations 37 and 38 are being machined by the corresponding tools T. Upon completion of the cycle the tool carriages 13 and 14 move away from the turret 25 so as to bring the tools T out of mesh with the gears G and at the same time rotation of the tools is stopped. For the next operation the operator completes a circuit which causes the turret to rotate through 180° of arc which will position the gears just loaded upon the machine at the corresponding working stations ready for advance of the tool carriages 13 and 14 to bring the tools T into mesh with the gears G now located at the working stations.

It will be appreciated that in order to prevent damage to the tools, the gears or the machine, some means is necessary to insure accurate meshing between the teeth of the tools and gears as the tool carriages move toward the turret. This means forms the subject matter of the present invention and will be described in detail.

Referring now to Figures 3, 4, 8 and 9, gear locator means indicated generally at 40 is provided on each face of the turret 25 in position intermediate the headstock 26 and the tailstock 27. This means is well illustrated in Figure 8, and comprises a bracket 41 having an opening therethrough for receiving a slide 42. As seen in this figure, the slide 42 is of rectangular cross section and fits closely in the opening formed through the bracket 41. The slide 42 at one side thereof is provided with rack teeth 43 and is engaged by a short gear sector 44 rigidly secured to a vertically extending rod 45 which is journaled at its top in a supporting bracket 46 rigidly secured to the face plate of the turret 25. The lower end of the rod 45 is provided with a handle 47.

The slide 42 is provided with a longitudinally extending opening therethrough for the reception of an elongated rod 48 connected to a nose piece 49 which projects from one end of the slide 42. The nose piece 49 is secured in position by a clamping bolt 50 so that as desired different nose pieces may be substituted on the slide 42. The nose piece 49 is adapted to be received in a tooth space of a work gear mounted between the headstock and tailstock previously referred to.

At its upper end the rod 45 is rigidly connected to a lever 51 which at its outer end is provided with a pair of switch actuators 52 and 53. These actuators are adapted to engage switches 54 and 55, respectively, so as to effect control of the sequence of machine operations. The bracket 46 is provided with a pin 56 to which is pivoted a block 57. The lever 51 is provided with a pin 58 pivotally secured thereto and carries a spring guide 59 which interconnects the pin 58 and the block 57 and is slidably associated with one of the parts. Surrounding the spring guide 59 is a coiled compression spring 60.

Figure 4:
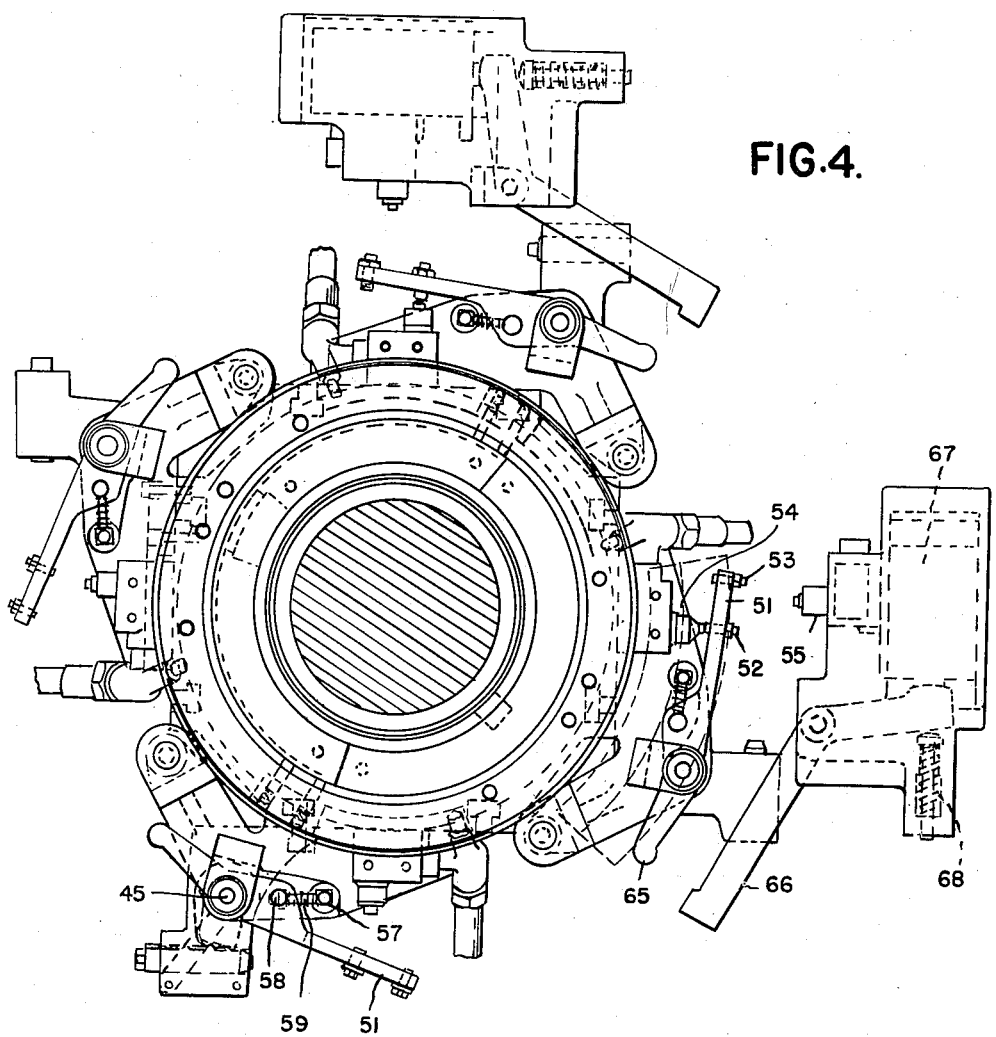
Figure 4 is a fragmentary sectional view on the line 4—4 of Figure 3.

Referring now to Figure 4, it will be observed that as the lever 51 is moved about the axis of the rod 45 the pin 58 moves from one side to the other of a line joining the rod 45 and the block 57 in an over center relationship. Accordingly, the spring 59 serves to bias the rod 45 in one direction or the other on rotation and accordingly biases the nose piece 49 either toward or away from the gear with which it is engaged.

Rigidly projecting from the lever 51 is an arm 65. The arm 65 when the mechanism with which it is associated is in the working position as illustrated in Figure 4 is adapted to be engaged by a lever 66 secured to the column 20 of the machine upon actuation of a solenoid indicated at 67 and working against a compression spring 63. It will be observed that when the lever 66 as illustrated in Figure 4 is rotated in clockwise position it will engage the arm 65 of the lever 51 and will move the same in a clockwise direction so as to cause the switch actuator 52 to move away from the switch 54 and to cause the switch actuator 53 to engage the switch 55, all for a purpose which will subsequently be described. At the same time, clockwise rotation of the lever 51 results in corresponding movement of the gear sector 44 and hence a withdrawing movement of the nose piece 49 from the gear with which it had previously been engaged. The parts are retained in the last mentioned position by virtue of the over center relationship of the spring 60.

The nose piece 49, as illustrated in Figure 8, is provided with a conical point 70. Preferably the conicity of the point 70 is selected so that it engages in a tooth space of a gear on the machine in substantially pitch line relationship. In addition to its function of locating the gear in rotation so that it may mesh properly with a cutter when it reaches the working station, the nose piece 49 has the additional function of sensing gear characteristics and more particularly oversize gears. The switch 54 is of the type referred to as a micro switch, and it will be observed that the switch actuating element 52 carried by the lever 51 comprises a threaded bolt and lock nut so that a fine adjustment between the switch actuator 52 and the switch 54 may be effected. Thus for example if the gear with which the conical point 70 of the nose piece 49 engages is oversize, the nose piece 49 will not move as far to the right as seen in Figure 8 as would otherwise be the case. It is found that a very accurate safety device is thus afforded. The present machine is adapted to remove material from the faces of the gear teeth on the orders of several thousandths of an inch in each pass, but if a gear is present which is considerably oversize, serious damage would be done to the cutter in attempting to remove more material than the machine can accommodate. Accordingly, by a proper adjustment of the switch contacting element 52 the switch locator serves as a safety device for preventing accidental operation on a gear which is oversize.

In high production work there may be a considerable variation in sizes of a series of supposedly like gears, and the present safety device is effective to prevent accidental injury to the cutter which would otherwise ensue.

If instead of employing a conical point 70 on the nose piece 49 a flat, tapered nose piece such as indicated at 71 is employed, the nose piece is effective to sense certain other gear characteristics. Thus for example, if the flat tapered end 71 is set around at a predetermined angle, the nose piece is adapted to sense helix angle and to prevent actuation of the machine in the event that the helix angle of the work gear deviates more than a predetermined minimum from an accessible helix angle. This feature of the machine is important for the reason that gear finishing machines of this type have a tendency to follow the lead on the gear and are not entirely effective to correct excessive leads. Thus if a work gear is present in the series of gears being finished which deviates more than the predetermined minimum from standard, it is desirable to throw out such a gear before it is machined. Even though machining such a gear need not cause injury to the machine or to the cutter, it would probably result in production of a finished gear whose helix angle was not within acceptable limits. The flat, tapered nose piece 71 of Figure 9 is also effective to sense another fruitful source of injury to gear cutters. A very large percentage of gears presented to the machine for a finishing operation have been hobbed, and it is found that almost invariably a certain percentage of such hobbed gears have been incompletely hobbed so that at one end thereof the tooth spaces have not been machined to full depth. This results from terminating the hobbing operation before the gear has been caused to traverse completely across the hob. Such a gear would not be picked up by the pointed nose piece 70, since such a nose piece would engage the gear only at two points intermediate the ends thereof. However, the flat, tapered nose piece 71 is adapted to engage a tooth space either of a straight or helical tooth from end to end thereof and accordingly will not move to full theoretical depth in the event that a tooth space is not of full depth at one end.

The flat, tapered nose piece 71 is found effective to select the hand of helical gears. In certain types of gearing, a number of gears are provided on a single shaft and it may be that one of the intermediate gears to be machined is of right-hand while the adjacent gear is of the opposite hand. If the work piece were positioned on the machine in inverted position the pointed nose piece 71 would not differentiate between a right and left-hand gear, but the flat, tapered nose piece 71 would of course be presented in a cross-wise direction to the tooth spaces of a gear of the wrong hand for finishing.

Referring again briefly to Figure 2, the cycle of operation of the machine includes first a rotation of the turret 25 to present two unfinished work gears at working stations 37 and 38. After the turret has come to rest with the work gears in proper position the tool carriages 13 and 14 advance toward the turret 25 to a position in which the teeth of the tools T carried thereby are in mesh with the gears G carried by the turret.

In order that the teeth of the tools T shall be presented to the gears G in proper relationship for free meshing engagement, means are provided for locating the tools T in rotation prior to movement of the tool carriages 13 and 14 toward the turret 25. These means are illustrated in Figures 5, 6, 7 and 10. Referring now to these figures, the tool spindle is illustrated at 80 and carries a gear-like tool T thereon. Suitable means, including gears 81 and 82 and bevel gears indicated generally at 83, are provided for rotating each tool T. An independent motor is provided for rotating each of the tools T and for simultaneously effecting relative traverse thereof with respect to the gears. This means, however, forms no part of the present invention and will accordingly not be described except to note that the driving connections intermediate the tool drive motors and each of the tools T are reversible in the sense that motion may be imparted to each tool T by application of force directly thereto. In other words, there is no irreversible driving mechanism, such for example as a worm, included between each motor and its tool T.

Keyed to the upper end of the tool spindle 80 is a disk 90 to which is rigidly secured a hardened annular toothed locator ring 91. The ring 91 is secured to the disk 90 by means of clamping bolts 92 passing through arcuate slots 93 formed in the ring 91. This permits adjustment of the ring 91 with respect to the particular tool T being employed. In practice, the ring 91 is provided with a number of sharp teeth 95 which correspond in number and pitch to the teeth on the tool T.

In the event that fine pitch gears are to be shaved it is especially intended to have the cutter index plate contain teeth, the number of which is a simple fraction of the number of teeth in the cutter. This results in larger teeth in the ring or plate, which have a correspondingly larger circumferential spacing. The great circumferential spacing between teeth of the index plate permits full force of the solenoid to be transmitted through the toggle linkage.

Referring now to Figure 10, positive means are provided for rotating the tool T to the proper position of rotation against the resistance offered by the motor and the driving connections between the motor and tool, and for retaining the tool in its proper position. This means takes the form of a bell crank indexing lever 100 pivoted adjacent its lower end, as indicated at 101, to a portion of the tool slide 31. At its upper end the lever 100 is provided with a hardened tooth plate 102 having a sharpened tooth adapted to be received in a tooth space between adjacent teeth 95 of the ring 91. Also pivoted to the slide 31 is a cross shaft 104 having depending levers 105 and 106 rigidly secured at its ends. Secured to the slide 31 is a pull solenoid 107 and a push solenoid 108. The pull solenoid 107 has an actuator 109 connected by a link 110 to the lower end of the lever 105. The push solenoid 108 has an actuator 111 which engaages against the lower end of the lever 106. Intermediate the ends of the shaft 104 is an actuating lever 112 which is connected to the indexing lever 100 by a short link 113. It will be observed that the linkage effected between the lever 112 and the index lever 100 is a toggle connection by means of which a relatively small force applied by the operative solenoid is effective to exert a very great force on the plate 102. The arrangement is such that energization of the pull solenoid 107 rocks the levers 105 and 112 to substantially the position shown in Figure 10 and exerts a very powerful force on the indexing lever 100. In the event that the indexing ring 91 is somewhat out of alignment with the tooth on the plate 102, this force is sufficient to effect a slight rotation of the ring 91 which is imparted to the tool spindle 80 and thence through the driving mechanism intermediate the spindle 80 and the drive motor associated therewith.

As seen in Figure 10a, plate 102 has a tooth 102a which terminates in a sharp edge at its forward end. In order to prevent this edge hanging up on a point of a tooth of the ring 91, the bottom corner of the tooth 102a is rounded off as indicated at 10b. This is desirable since motion of the tooth 102a as it moves into engagement with the ring is about the axis of pivot 101.

Referring now to Figure 7, the indexing lever 100 has a lateral projection 120 carried thereby which is provided with an adjustable switch actuator 121 adapted to actuate a switch 122, whose function will presently be described. The arrangement is such that the switch 122 is actuated when the indexing lever 100 is moved away from the index ring 91 so as to free the tool for rotation.

The foregoing apparatus includes electrical controls briefly referred to in passing. The complete operation of the machine including the sequential operation of the electrical controls will now be described.

The handle 29 which actuates the movable center in the tailstock 27 is adapted to actuate a switch (not shown) which controls operation of the machine. Thus until a gear is firmly gripped between centers, automatic operation of the machine is impossible. After the gear has been placed between centers it is located in rotation by actuation of the handle 47 which moves the plunger 49 into position between adjacent teeth of the gear. If the plunger 49 is permitted to seat fully in a gear of proper size, motion of the handle 47 is accompanied by a corresponding motion of the lever 51 and movement of the switch actuator 52 into engagement with the switch 54 (Figure 8). Until the switch 54 is actuated, automatic control of the machine is impossible.

Upon completion of the previous cycle, means are provided for actuating the pull solenoid 107 which rotates the lever 112 in position to force the indexing lever 100 toward the toothed ring 91 and thus to effect location and locking of the tool in rotation.

The operator presses a manual starting button to energize a motor which indexes the turret 25 through 180°. Suitable indexing mechanism which forms no part of the present invention locks the turret in its new position and completes a circuit which results in travel of tool carriages 13 and 14 toward the turret 25, and gears G and tools T come into mesh. A switch (not shown) stops forward travel of carriages 13 and 14, and completes a circuit to the push solenoid 67 (Figure 4). This solenoid swings the lever 66 into engagement with the arm 65 of the lever 51 and moves the plunger or nose piece 49 out of engagement with the work gear G. At the same time, switch actuator 53 carried by the lever 51 actuates the switch 55. This in turn completes a circuit to the push solenoid 108 which releases the finger of the plate 102 from the toothed ring 91 and thus releases the tool T for rotation. Movement of the lever 100 toward cutter releasing position results in actuation of the switch 122 by its actuator 121, which in turn closes a circuit to the cutter drive motor. This motor effects rotation of the cutter and also effects vertical traverse of the cutter slide 31 through a predetermined number of reciprocations. Means are provided for interrupting the reciprocation of the cutter slide 31 after the predetermined number of reciprocations, for stopping the rotation of the cutter and for causing the cutter carriages 13 and 14 to move away from the turret 25. After the cutter carriages have moved away from the turret 25 so as to free the tools T from the finished gears G, a circuit is closed to pull solenoid 107, thus actuating the mechanism for locating and locking the cutters in position for engagement with unfinished gears upon the next cycle of the machine.

The present application is a continuation-in-part of my copending application Serial No. 622,280, filed April 15, 1946, entitled "Gear Finishing," and reference is had to this prior copending application for an explanation of details of the machine if such are desired. However, all of the mechanism which enters into the subject matter claimed is described herein.

While I have illustrated and described in considerable detail improved mechanism for an automatic gear finishing machine, this has been done merely to enable those skilled in the art to practice the present invention, the scope of which is indicated by the appended claims.

What I claim as my invention is:

1. In a gear finishing machine, a rotary work supported for a gear, a rotary tool support for a gear-like cutter, means for effecting relative travel between said supports substantially radially of one of said supports to mesh a gear and tool carried thereby, tool locator means for locating said tool in rotation on said tool support, gear locator means for locating said gear on said work support in rotation relative to the location of said tool so as to permit full meshing of said gear and tool upon said relative travel, first motor means for effecting said travel, second motor means for rotating said tool support, said gear locator means including a tapered element movable into a tooth space of said gear and effective to sense an oversize gear, control means operable by said gear locator to prevent operation of said first motor means if said gear is oversize, and locator release means effective to release both said tool and gear locator means operable by completion of said relative travel.

2. In a gear finishing machine, a rotary work support for a gear, a rotary tool support for a gear-like cutter, means for effecting relative travel between said supports substantially radially of one of said supports to mesh a gear and tool carried thereby, tool locator means for locating said tool in rotation on said tool support, gear locator means for locating said gear on said work support in rotation relative to the location of said tool so as to permit full meshing of said gear and tool upon said relative travel, first motor means for effecting said travel, second motor means for rotating said tool support, said gear locator means including a tapered element movable into a tooth space of said gear and effective to sense an oversize gear, control means operable by said gear locator to prevent operation of said first motor means if said gear is oversize, locator release means effective to release both said tool and gear locator means operable by completion of said relative travel, and means operable by said locator release means for starting said second motor means.

3. In a gear finishing machine, a rotary tool support for a gear-like tool, a motor for rotating said support, reversible driving connections between said motor and support, a locator disk rotatable with said support, said disk having peripheral, sharp pointed teeth alike in number and spacing to the teeth of a tool carried by said support, a sharp pointed locator finger movable radially fully into a tooth space on said disk, toggle linkage for moving said finger, and a pair of solenoids connected to said linkage for effecting movement of said finger in opposite directions, said finger and linkage being effective to turn said tool support against the resistance of said driving connection and motor.

4. A gear finishing machine comprising an indexable turret, a plurality of rotary work supports on said turret, a tool carriage movable toward and away from said turret, a tool slide on said carriage movable thereon in a plane parallel to the axis of said work support, a traverse motor for moving said tool slide, a tool support on said tool slide, a tool drive motor for rotating said tool support, automatic cycling means for energizing said tool drive motor and said traverse motor and for interrupting operation of said motors after the cycle is completed, automatic tool locator means for moving the tool holder to proper rotative position, manual means for locating a work gear in proper rotative position, automatic means operable in response to completion of forward movement of said tool carriage to release said tool and work locator means.

5. An automatic gear finishing machine comprising a rotatable turret, rotary work supports spaced around said turret, a tool carriage mounted for movement toward and away from said turret, a tool slide reciprocable on said carriage, a rotary tool support on said slide, a tool drive motor therefor, an index motor for rotating said turret to move one work support from loading position to a working position adjacent said tool carriage and to move another work support from working position to loading position, a manually operable work locator comprising a part movable into a tooth space of a work gear, an automatically operable tool locator comprising power actuated means for rotating the tool support into correct rotational position, motor means operable automatically upon completion of indexing movement of said turret for moving said tool carriage toward the work support in working position, control means operable automatically by movement of said tool carriage into working position to release said work and tool support for rotation, and means operable automatically by said control means for initiating operation of said tool drive motor.

6. An automatic gear finishing machine comprising a frame, a rotatable turret on said frame, rotary work supports spaced around said turret, a tool carriage on said frame mounted for movement toward and away from said turret, a tool slide reciprocable on said carriage, a rotary tool support on said slide, a tool drive motor therefor, an index motor for rotating said turret to move one work support from loading position to a working position adjacent said tool carriage and to move another work support from working position to loading position, a manually operable work locator on said turret adjacent each of said work supports comprising a part movable into a tooth space of a work gear and including a movable release member, an automatically operable tool locator comprising power actuated means for selectively rotating the tool support into correct rotational position and releasing said tool support for rotation, motor means operable automatically upon completion of indexing movement of said turret for moving said tool carriage toward the work support in working position, a power actuated work release device on said frame including a movable part cooperable with said release member when the associated work support is in working position, control means operable automatically by movement of said tool carriage into working position to actuate said work release device to release said work and to release said tool support for rotation, and means operable automatically by said control means for initiating operation of said tool drive motor.

7. A machine as defined in claim 6 in which said work release device comprises, a first solenoid, said tool locator comprises a second solenoid operable to locate said tool support, and a third solenoid operable to release said tool support, and said work locator has a switch operable thereby to energize said third solenoid when said work locator is moved to work releasing position by said first solenoid.

WALTER S. PRAEG.

REFERENCES CITED

The following references are of record in the file of this patent:

UNITED STATES PATENTS

| Number | Name | Date |
| --- | --- | --- |
| 1,034,927 | Oehler | Aug. 6, 1912 |
| 1,829,263 | Carlsen | Oct. 27, 1931 |
| 2,150,313 | Bauer | Mar. 14, 1939 |
| 2,304,148 | Carlsen | Dec. 6, 1942 |